March 19, 1929.   H. O. STEPHENS   1,706,193
TRANSFORMER
Filed June 11, 1928
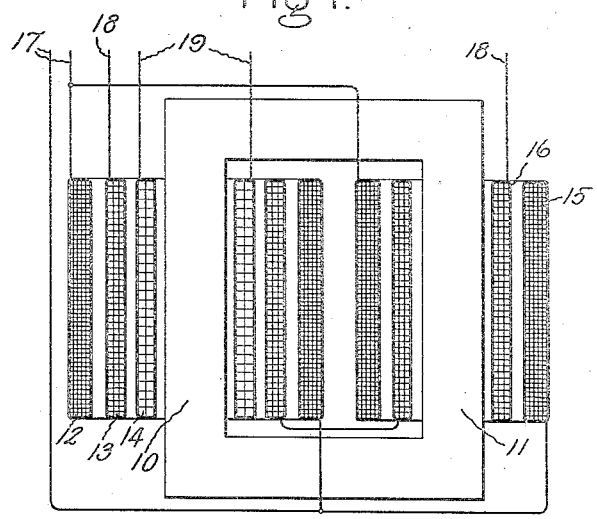
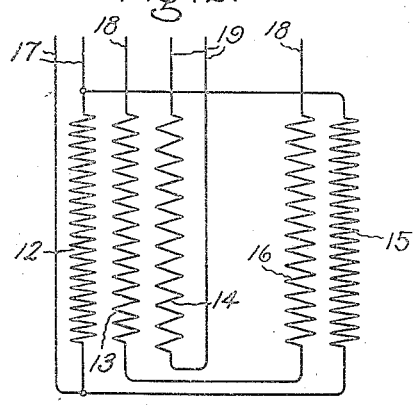 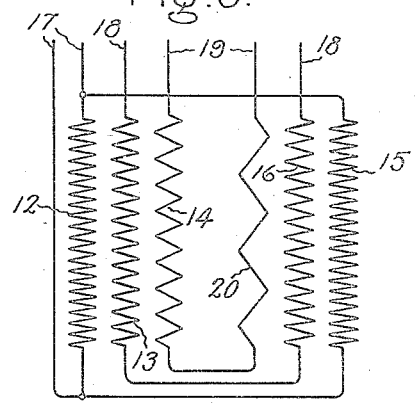
Inventor:
Howard O. Stephens,
by Charles V. Mullan
His Attorney.

Patented Mar. 19, 1929.

1,706,193

UNITED STATES PATENT OFFICE.

HOWARD O. STEPHENS, OF PITTSFIELD, MASSACHUSETTS, ASSIGNOR TO GENERAL ELECTRIC COMPANY, A CORPORATION OF NEW YORK.

TRANSFORMER.

Application filed June 11, 1928. Serial No. 284,403.

My invention relates to transformers. A transformer usually has a primary and a secondary winding and many high voltage transformers also have a tertiary winding which is often of much smaller capacity than that of the primary and secondary windings. This tertiary winding may be used to supply a small current at a voltage different from that of either the primary or secondary winding for any desired purpose such as to run a synchronous condenser.

When the windings of a transformer are of the concentric cylindrical type, the tertiary winding is usually disposed next to the winding leg of the core because this winding has the lowest voltage, the main high voltage winding being outside and the main low voltage winding being between the high voltage and tertiary windings.

If the main high and low voltage windings are arranged so that the reactance between them has about the usual value in transformers of this type, then the reactance between the main low voltage winding and the tertiary winding will be extremely low. The tertiary winding may also be rather small and weak mechanically because of its small capacity. If the capacity of generators or other synchronous apparatus connected to the main low voltage winding or to the tertiary winding is considerable as compared with the rating of the transformer, such a tertiary winding would be very vulnerable to short circuit forces and also to the effects of heating due to short circuit current if there was any considerable delay in the action of proper protective devices.

The general object of the invention is to provide a transformer having an improved arrangement of main high and low voltage and tertiary windings with a usual normal reactance between the main high and low voltage windings but with a high reactance between the main low voltage and tertiary windings to protect the tertiary winding from excessive currents and magnetic forces under short circuit conditions.

The invention will be better understood from the following description taken in connection with the accompanying drawing in which Fig. 1 is a view of a transformer constructed in accordance with the invention, the windings being shown in section; Fig. 2 is a diagrammatic view of the windings shown in Fig. 1, and Fig. 3 is a diagrammatic view of a modified arangement of windings.

Like reference characters indicate similar parts in the different views of the drawing.

In the form of the invention shown in Fig. 1 and indicated diagrammatically in Fig. 2, the transformer includes a magnetic core having two winding legs 10 and 11 connected by magnetic yokes in the usual manner. The winding leg 10 is surrounded by a main high voltage winding 12, a main low voltage winding 13 and a tertiary winding 14. The winding leg 11 is surrounded by a main high voltage winding 15 and a main low voltage winding 16.

It is preferable for insulating reasons that the windings of lower voltage be nearest the core. The low voltage tertiary winding 14 is, therefore, nearest the winding leg 10 and the main high voltage windings 12 and 15 are farthest out, the main low voltage winding 13 being between the tertiary winding 14 and the main high voltage winding 12 and the main low voltage winding 16 being between the winding leg 11 and the main high voltage winding 15. The main high and low voltage windings on each winding leg are close together so that the reactance between them will be low.

The main high voltage windings 12 and 15 are connected in parallel between the high voltage terminals 17. The main low voltage windings 13 and 16 are connected in series between the low voltage terminals 18. The tertiary winding is connected between the terminals 19. With this arrangement, the reactance between the tertiary windings 14 and the main low voltage circuit including the windings 13 and 16 will be high even though the reactance between the main high and low voltage circuits is low. This will be apparent by considering the conditions if the terminals 19 of the tertiary winding be short-circuted and voltage be applied to the terminals 18 of the main low voltage winding. A current will be induced in the short-circuited tertiary winding but only part of this current will be induced by current in the winding 13. The remainder of the current in the tertiary winding will be indirectly induced by current in the winding 16 which, of course, is the same current that is flowing in the winding 13 because the windings 13 and 16 are connected in series. The current in the winding 16 induces a voltage in the winding 15 and this causes a flow of current in this winding 15 and in the winding 12, this current in the winding 12 inducing that part of the current in the tertiary winding 14 that is not directly induced by the current in the winding 13. The reactance between the tertiary winding 14 and the winding 13 is low but the reactance between the tertiary winding 14 and the winding 16 is high, the latter reactance being approximately equal to the sum of the reactances between the windings 16 and 15 and between the windings 12 and 14. It is thus obvious that the reactance between the tertiary winding 14 and the main low voltage circuit including the two windings 13 and 16 is much greater than it would be if the tertiary winding were formed in two equal parts arranged close to the two windings 13 and 16 respectively as has been the usual practice heretofore.

It may sometimes be found that with the arrangement which has been described and which is indicated in Figs. 1 and 2, the reactance between the tertiary and main low voltage windings is too great. A lower value of this reactance may be obtained by arranging the windings so that the average effective separation of the tertiary turns and the windings 13 and 16 is reduced as shown in the modified form of the invention indicated in Fig. 3. In this arrangement, some of the tertiary turns are formed into a second tertiary winding 20 surrounding the same winding leg 11 with the main high and low voltage windings 15 and 16 and close to the low voltage winding 16. The reactance is thus low between this small tertiary winding 20 and the main low voltage winding 16. It is obvious that by bringing part of the tertiary turns close to the winding 16, the reactance between the tertiary circuit including the windings 14 and 20 and the main low voltage circuit including the windings 13 and 16 is lower than with none of the tertiary turns close to the winding 16 as in the arrangement shown in Figs. 1 and 2 because the average effective separation is smaller. This reactance will depend upon the distribution of the tertiary turns between the two windings 14 and 20 and may have any value desired between a maximum limit with all the turns in the winding 14 as in Figs. 1 and 2 and a minimum limit with the turns equally distributed in the two windings 14 and 20 of Fig. 3 as has been the usual practice heretofore.

The invention has been explained by illustrating and describing preferred forms thereof but it will be apparent that various changes may be made without departing from the scope of the invention as defined in the appended claims.

What I claim as new and desire to secure by Letters Patent of the United States is:

1. A transformer including a magnetic core having two winding legs, two parallel connected windings surrounding said two winding legs respectively, two series connected windings surrounding said two winding legs respectively, and tertiary winding turns surrounding at least one of said winding legs.

2. A transformer including a magnetic core having two winding legs, two parallel connected windings surrounding said two winding legs respectively, two series connected windings surrounding said two winding legs respectively, and two series connected tertiary windings surrounding said two winding legs respectively.

3. A transformer including a magnetic core having two winding legs, two parallel connected windings surrounding said two winding legs respectively, two series connected windings surrounding said two winding legs respectively, and two series connected tertiary windings surrounding said two winding legs respectively, the number of turns in said two teritary windings being unequal.

4. A transformer including a magnetic core having two winding legs, two parallel connected windings surrounding said two winding legs, respectively, two series connected windings surrounding said two winding legs respectively, and tertiary winding turns surrounding at least one of said winding legs, the average effective separation of said tertiary turns being smaller from one of said series connected windings than from the other of said series connected windings.

In witness whereof, I have hereunto set my hand this 6th day of June, 1928.

HOWARD O. STEPHENS.